United States Patent [19]

Elenewski

[11] Patent Number: 4,638,728
[45] Date of Patent: Jan. 27, 1987

[54] VISOR DEFROSTER

[75] Inventor: Allen Elenewski, Rte. 2, 2270 15th La., Friendship, Wis. 53934

[73] Assignee: Allen Elenewski, Friendship, Wis.

[21] Appl. No.: 760,988

[22] Filed: Jul. 31, 1985

[51] Int. Cl.[4] ............................................. B60H 1/03
[52] U.S. Cl. .......................................... 98/2.08; 2/435; 98/2.09; 98/2.1; 219/211
[58] Field of Search ..................... 98/2.05, 2.08, 2.09, 98/2.1; 2/435; 219/211

[56] References Cited

U.S. PATENT DOCUMENTS

| | | | |
|---|---|---|---|
| 1,963,990 | 6/1934 | Gilkeson et al. | 2/435 |
| 2,539,284 | 1/1951 | Thomas | 2/14 |
| 3,024,341 | 3/1962 | Ogle, Jr. et al. | 219/20 |
| 3,027,561 | 4/1962 | Senne | 2/14 |
| 3,160,735 | 12/1964 | Aufricht | 219/201 |
| 3,495,259 | 2/1970 | Rocholl et al. | 2/435 |
| 3,553,432 | 1/1971 | Livingston et al. | 2/435 |
| 3,825,953 | 7/1974 | Hunter | 2/14 K |
| 4,209,234 | 6/1980 | McCooeye | 351/62 |
| 4,404,460 | 9/1983 | Kerr | 219/211 |

FOREIGN PATENT DOCUMENTS

| | | |
|---|---|---|
| 373865 | 4/1923 | Fed. Rep. of Germany . |
| 636251 | 5/1983 | Switzerland . |
| 264280 | 1/1927 | United Kingdom . |

Primary Examiner—Ronald C. Capossela
Attorney, Agent, or Firm—Lowe, Price, Leblanc, Becker & Shur

[57] ABSTRACT

Condensed breath vapor is removed from visors on helmets adapted to be used by drivers of open air outdoor vehicles, such as snowmobiles, motorcycles, and all terrain vehicles, by applying electric current to a resistance heater coil on the visor. The heating coil is electrically connected to a connector mounted on the visor. The connector is electrically connected by a helically coiled cable to an assembly mounted on the vehicle dashboard. The assembly includes a female jack for receiving a male jack at the end of the coiled helical cable. The assembly also includes a switch for connecting the jack to a power supply of the vehicle, so that electric energy from the power supply can be coupled selectively to the female jack at two power levels.

22 Claims, 7 Drawing Figures

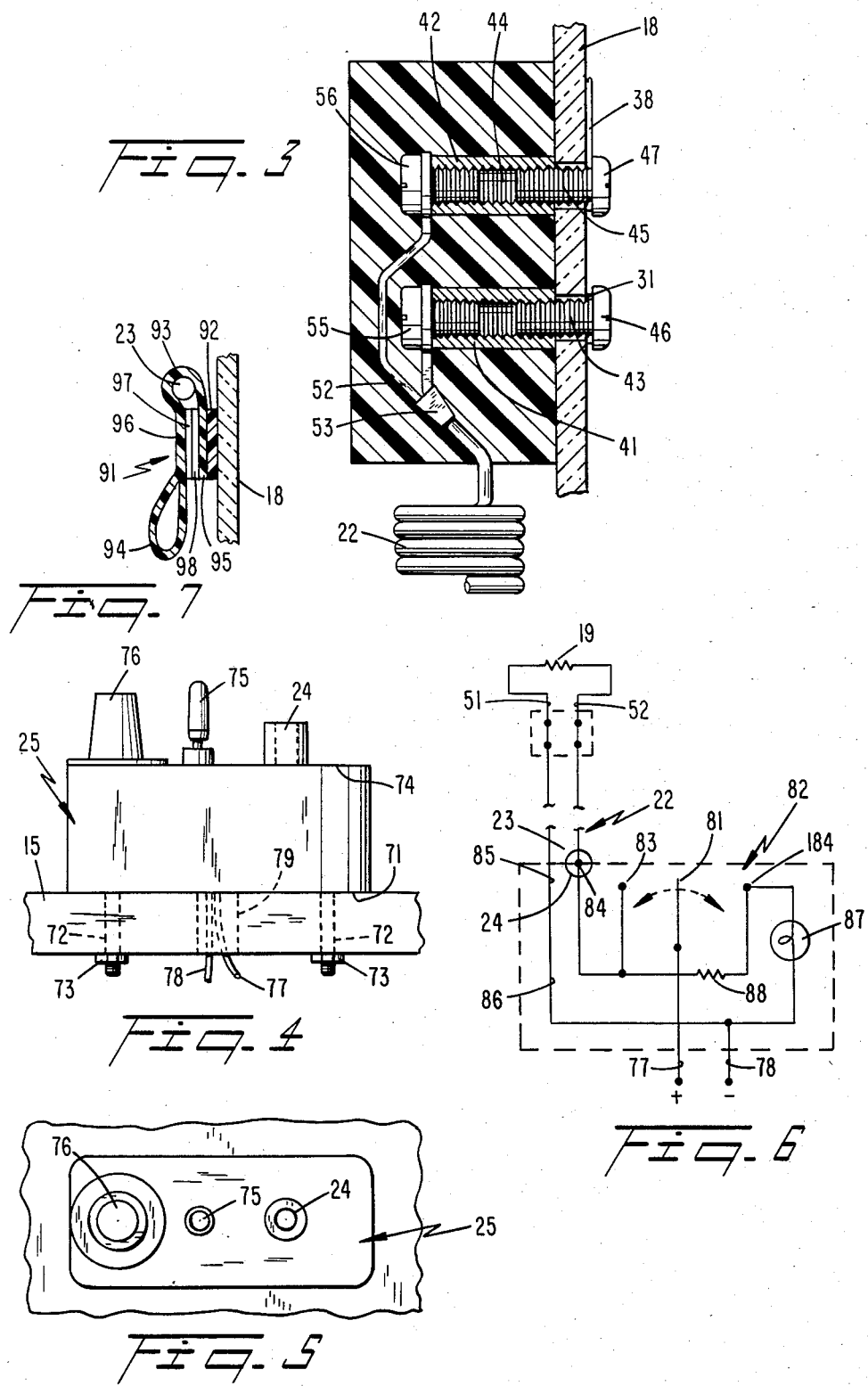

VISOR DEFROSTER

TECHNICAL FIELD

The present invention relates generally to visors for open air outdoor vehicles, such as snowmobiles, motorcycles and all terrain vehicles, and more particularly to a method of and apparatus for preventing the formation of and/or removing condensed breath vapor and/or ice from such visors by the application of electric energy thereto.

BACKGROUND ART

For safety reasons, operators of outdoor vehicles, such as snowmobiles, motorcycles, and all terrain vehicles, frequently wear, and in many instances are required to wear, helmets. The helmets frequently include face shields or visors made of optically transparent material to enable the operator to see where he is going, while protecting him from debris. It has been found, however, that when these outdoor vehicles are operated in the winter there is a tendency for vapor from the breath of the operator to condense on the visor and render it opaque to optical energy. Thereby, the operator of the vehicle is not able to see where he is going and the visor presents a safety hazard, to defeat the original purpose thereof. To my knowledge, there has been no solution to this problem, even though it has existed for several years.

It is, accordingly, an object of the present invention to provide a new and improved apparatus for removing condensed breath vapor of an operator from a visor worn by the operator of an open air outdoor vehicle.

Another object of the invention is to provide an improved, relatively inexpensive breath vapor removing visor that is particularly adapted for use with open air outdoor vehicles, such as snowmobiles, motorcycles, and all terrain vehicles.

An additional object of the invention is to provide an optically transparent visor particularly adapted to be used by operators of open air outdoor vehicles, wherein the visor includes electric heating means for removing and preventing the formation of condensed breath vapor on the visor, wherein the electric heater is connected to a power supply of the vehicle in such a manner as to enable the operator to move freely and a lead on the connection means does not interfere with the operator to any appreciable extent.

A further object of the invention is to provide a visor with electric heating means for preventing and removing condensed breath vapor of an operator wearing the visor, wherein the electric heating means is connected to an electric power supply of an open air outdoor vehicle by a connection device that easily pulls away from a connector mounted on the vehicle in the event of an emergency.

DISCLOSURE OF INVENTION

In accordance with one aspect of the present invention, condensed breath vapor on a visor of a helmet worn by an operator of an outdoor vehicle is removed by applying electric heat to the visor. Electric energy is applied to the visor at a plurality of power levels, preferably as selected by the operator, as a function of the amount of condensate on the visor, which in turn is a function of the temperature of the outdoor environment where the vehicle is being operated.

In accordance with the preferred embodiment, the electric heat is applied to the visor by an electric resistance heating coil secured to the visor in such a manner as not to obstruct the vision of the operator. An electric connector for the resistance heating coil is fixedly mounted on the visor in a position considerably out of the line of sight of the operator. The electric connector mounted on the visor provides permanent connections to one end of a helically coiled cable, having a second end terminating in a male jack. The vehicle is equipped with a housing containing a female jack for the male jack at the end of the helical cable. The housing also includes a multiposition switch for selectively connecting the vehicle power supply to the female jack. The multiposition switch is connected to circuitry within the housing to enable the power coupled between the vehicle power supply and the resistance heating coil to be varied, to provide the required amount of heat to remove the condensed breath vapor, while enabling the power drain on the vehicle power supply to be relatively constant at a minimum level.

The helical coil is particularly advantageous because it enables the operator to easily move on the seat of the vehicle. In the event of an emergency, the operator is able to escape because the male jack easily pulls from the female jack in the housing mounted on the vehicle dashboard.

The above and still further objects, features and advantages of the present invention will become apparent upon consideration of the following detailed description of one specific embodiment thereof, especially when taken in conjunction with the accompanying drawings.

BRIEF DESCRIPTION OF THE DRAWING

FIG. 3 is a side, sectional view of the connector housing on the visor, the visor, heating coil and cable illustrated in plan view in FIG. 2;

FIG. 4 is a side view of a switch assembly adapted to be mounted on the dashboard of the snowmobile illustrated in FIG. 1;

FIG. 5 is a plan view of the switch assembly illustrated in FIG. 4;

FIG. 6 is an electric schematic diagram of the apparatus illustrated in FIGS. 1-5; and FIG. 7 is an enlarged side view of a holder for maintaining the cable in situ on the visor

BEST MODE FOR CARRYING OUT THE INVENTION

Figure 1:
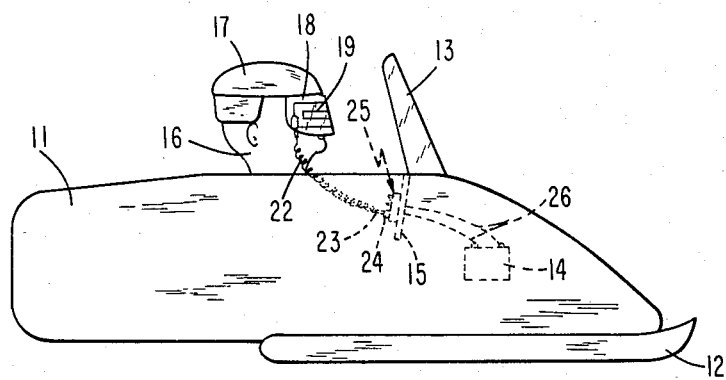
FIG. 1 is a schematic-type view of a snowmobile and operator equipped with the present invention.

Reference is now made to FIG. 1 of the drawing wherein conventional snowmobile 11, an outdoor, open air vehicle adapted to be operated in winter climates, is illustrated. Snowmobile 11 includes the usual internal combustion engine, driven belt, starter, etc. (none of which are shown), as well as steering skids 12, optically transparent plexiglass windshield 13, an electric power supply in the form of a battery 14 or an exciter coil of the engine, and dashboard 15 in a cockpit where operator 16 is seated. The cockpit includes the usual controls, such as a steering wheel, and accelerator pedal (not shown). For safety purposes, operator 16 is equipped with a conventional helmet 17 to which is connected optically transparent, electrically insulating face shield or visor 18 that is either permanently or removably secured to a helmet 17, in a manner well known to those skilled in the art; typically visor 18 is made of a suitable plastic, such as plexiglass.

Because of the cold climatic conditions which usually subsist during operation of snowmobile 11 by operator 16 the operator exhales a considerable amount of breath vapor that condenses on the interior surface of optically transparent visor 18. The human breath vapor condensed on the interior of visor 18 has a tendency to render the visor opaque, or at the best translucent, thereby severely limiting the ability of operator 16 to see where he is going and operate snowmobile 11 in a safe manner. Generally, as the temperature in the environment where snowmobile 11 is being operated decreases, there is an increasing tendency for the deposition of vapor on the interior of visor 18. Frequently, the condensed vapor freezes on the interior of the visor, making the visor completely inoperative. Hence, it frequently happens that operator 16 removes visor 18 from helmet 17, with the likelihood of an object striking the face of the operator.

In accordance with the present invention, condensation of human breath vapor on visor 18 is prevented and/or the condensed breath is removed by heating the visor with electric energy derived from supply 14. To this end, the interior of visor 18 is provided with electric resistance heating coil 19, having ends electrically and mechanically connected to terminals in connector housing 21, also fixedly mounted on visor 18. Housing 21 includes fixed connections to first ends of a pair of leads in two-lead helically coiled cable 22, having a second end connected to male jack 23, preferably of the phono type. Phono jack 23 is inserted by operator 16 into female receptacle 24 therefor; receptacle 24 is carried by switch assembly 25, mounted on dashboard 15. To avoid shock hazards, it is important for cable 22 to be fixedly secured to housing 21 and visor 18. In experiments that I have conducted with cables connected to visor 18 by a quick disconnect structure, I have found that the cable becomes inadvertently detached from the visor while in use due to contact with unavoidable obstructions, such as tree limbs. This is unsafe because cord 22 remains connected to the power supply 14 and is left dangling in such a manner as to create a possible short circuit.

Receptacle 24 is electrically connected by leads 26 to terminals of supply 14. When jack 23 is inserted into receptacle 24 and suitable connections are established by operator 16 activating a toggle (not shown in FIG. 1) of switch assembly 24, supply 14 supplies electric current to resistance heating coil 19. For very cold conditions, operator 16 adjusts the toggle of housing 25 to cause supply 14 to supply maximum current to coil 19. If, however, snowmobile 11 is operating in a warmer winter environment, decreased energy is supplied by supply 14 to coil 19 in response to the operator activating the toggle of housing 25 which causes a resistor (not shown in FIG. 1) contained in housing 25 to be connected between supply 14 and coil 19. If the operator does not believe that any additional heat is necessary, the toggle on housing 25 can be adjusted to an off position, to disrupt the connection of supply 14 to coil 19, even though jack 23 remains in receptacle 24.

Heating coil 19 is positioned on visor 18 so that the heating coil does not adversely affect the field of view of operator 16. Cable 22 has a length and is coiled in such a way as to enable operator 16 to move freely about in the cockpit of snowmobile 11, while jack 23 remains connected to receptacle 24. If, however, an emergency should occur and it is necessary for operator 16 to leave the cockpit of snowmobile 11 suddenly, jack 23 easily and quickly pulls out of receptacle 24 in response to the force exerted on cable 22 by the sudden movement of head of operator 16 in such a situation.

Figure 2:
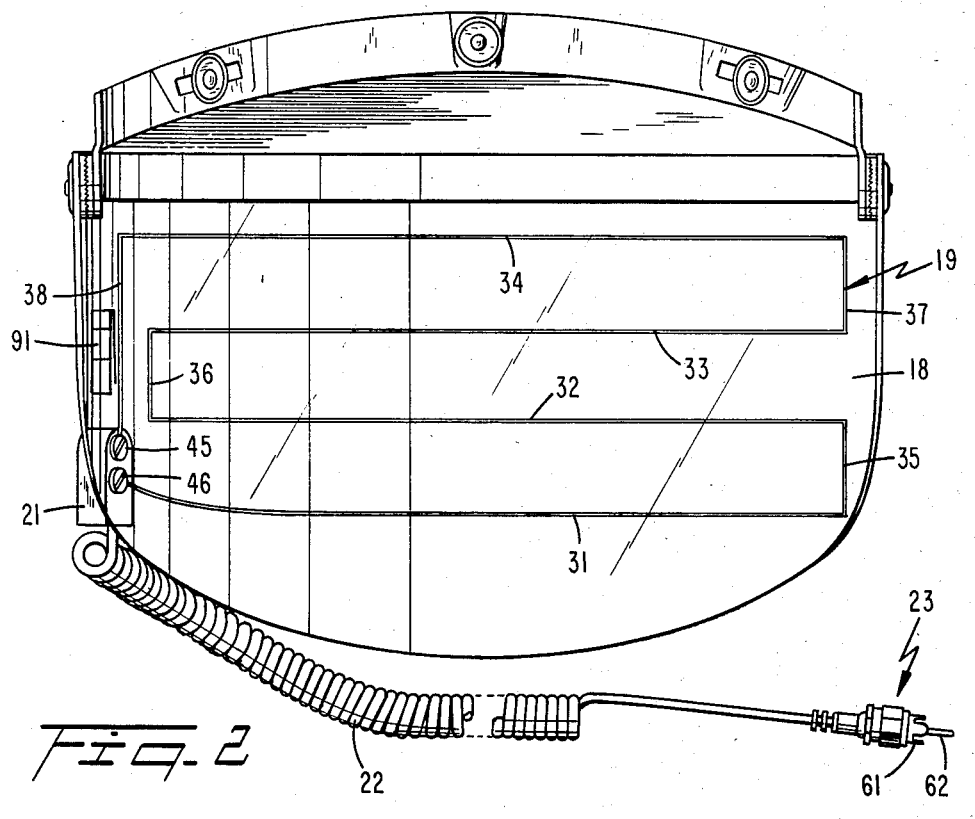
FIG. 2 is a front view of a visor equipped with a resistive heating coil, housing connector, and cable in accordance with a preferred embodiment of the invention.

Reference is now made to FIG. 2 of the drawing, a plan view of visor 18, as viewed by operator 16 when helmet 17 is in situ, in combination with connector housing 21, cable 22 and jack 23. Resistance heating coil 19, which may be preformed and adhered by suitable adhesive to visor 18 or be an electric conducting paint coated on the visor, is fixedly adhered to the interior of visor 18, i.e., the face of the visor closest to the face of operator 16 when the visor is positioned on helmet 17 and the helmet is being warn by the operator. Resistance heating coil 19 has a tortious path that does not block the field of view for the eyes of opeator 16 and includes four horizontal segments 31–34, each having a width of approximately one-eighth inch and extending from adjacent one edge of visor 18 to adjacent the other edge; segments 31–34 are spaced from the edges of the visor by approximately one inch. Coil 19 also includes vertically extending segments 35–38, arranged such that segments 35–37 connect the ends of adjacent horizontal segments together; i.e., vertical segment 35 connects the right ends of horizontal segments 31 and 32 to each other, vertical segment 36 connects the left ends of horizontal segments 32 and 33 to each other, and vertical segment 37 connects the right ends of segments 33 and 34 to each other. The left end of horizontal segment 31 is connected to a terminal in connector housing 21, while the left end of segment 34 is connected to another terminal in housing 21 by vertically extending segment 38. Housing 21 is positioned in the lower left corner of visor 18, on the exterior face of the visor so that the connector is out of the field of view of operator 16 and cannot contact the face of the operator.

Housing 21 is fabricated of an electrically insulating material, preferably a molded polymer resin. The resin is molded about and holds in situ metallic cylindrical posts 41 and 42, having internally threaded bores 43 and 44. Cylinders 41 and 42 are positioned in housing 21 in such a manner that the longitudinal axes thereof are parallel to each other and at right angles to planar face 45 that abuts against the exterior of visor 18. Cylinders 41 and 42 are positioned so that they are respectively aligned with horizontal resistive segment 31 and vertical resistive segment 38, with the segments extending only slightly beyond the posts. Metal bolts 46 and 47 respectively impale segments 31 and 38 and respectively fit into bores 43 and 44 to provide electric connections between segments 31 and 38 and cylinders 41 and 42. In addition, threaded bolts 45 and 46 provide a fixed mechanical connection between connector housing 21 and visor 18. One end of each of cylindrical posts 41 and 42 is coplanar with face 45 of connector housing 21.

Cylinders 41 and 42 electrically connect segments 31 and 38 to leads 51 and 52 in cable 22. To this end, the ends of leads 51 and 52 remote from jack 23 are mechanically and electrically connected to electrical terminal lugs 53 and 54, respectively. Lugs 53 and 54 are captured by the heads of bolts 55 and 56 which are respectively threaded into bores 43 and 44 to provide mechanical and electrical connections between lugs 53 and 54 and cylinders 41 and 42. Segments 31 and 38 and the heads of bolts 46 and 47 are dimensioned so that the bolts, when screwed into bores 43 and 44 bear against the exterior portions of the resistive coil segments and the exterior face of visor 18. Thereby, bolts 46 and 47 perform the dual functions of securing housing 21 to visor 18 and providing electric connections between opposite ends of resistance heating coil 19 to the leads in cable 22 by way of electric connections established by cylinders 41 and 42, as well as lugs 53 and 54.

Housing 21 is formed by being molded about the posts, lugs, leads and bolts 55 and 56. Housing 21 includes a semicircular upper surface 57 to provide a smooth surface that is not objectionable to the feel of operator 16. The other end of cable 22 is connected to a conventional coaxial, male phono jack 23. Exterior prongs 61 of jack 23 are electrically connected in parallel to lead 51, while interior probe 62 is connected to lead 52.

Reference is now made to FIGS. 4 and 5 wherein switch assembly 25 is illustrated. Switch assembly 25 includes female receptacle 24 for male jack plug 23, connections to leads from supply 14, as well as a toggle for controlling whether maximum current, or reduced current, or no current is supplied to jack 23 by supply 14. To these ends, housing 25 is a molded plastic right parallelepiped having rounded corners with a face 71 that abuts against dashboard 15 of snowmobile 11. Extending downwardly from face 71 are threaded bolts 72 which are anchored in housing 25 and are secured by nuts 73 to the face of dashboard 15 opposite from the dashboard face against which housing face 71 abuts. Extending from face 74 of housing 25 opposite from housing face 71 are coaxial receptacle 24, three-position toggle switch lever 75 and colored lens 76 that is received in a lamp receptacle (not shown) into which an incandescent lamp is screwed. Extending from face 71 and through aperture 79 of dashboard 15 are leads 77 and 78, which are the same as or are connected to leads 28, thence to supply 14.

In the illustrated, central position of lever 75, no current is supplied by supply 14 via leads 77 and 78 to receptacle 24 or lamp 76, whereby coil 19 and the incandescent lamp are de-energized. In response to lever 75 being turned to the left, as illustrated in FIGS. 4 and 5, maximum current is supplied by supply 14 via leads 77 and 78 to receptacle 24, whereby maximum heating is provided by resistance coil 19, as is required for very low temperature operation of snowmobile 11. In response to lever 75 being activated to the right, as illustrated in FIGS. 4 and 5, a resistor within housing 25 is connected in series between one of leads 77 and 78 and a terminal of female receptacle 24, so that reduced current is supplied to resistance coil 19, and sufficient heat is supplied by the coil to visor or face shield 18 to prevent and/or remove condensation from the visor for higher temperature situations. When maximum current is supplied to receptacle 24 by leads 77 and 78, as subsists when lever 75 is in the left position, the resistor in housing 25 and the incandescent lamp are connected in series in a branch circuit directly across leads 77 and 78. When lever 75 is turned so that it is on the right side, the incandescent lamp is connected directly across leads 77 and 78. Thereby, a substantially constant impedance is provided to leads 77 and 78 regardless of whether lever 75 is positioned to the left or to the right.

Reference is now made to FIG. 6 of the drawing, a circuit diagram of the connections between leads 77 and 78 and resistance heating coil 19, assuming that male jack 23 is inserted into female receptacle 24. Leads 77 and 78 are respectively connected to positive and negative terminals of supply 14, with lead 77 being directly connected to armature 81 of three-position toggle switch 82, that is controlled by lever 75. Toggle switch 82 is illustrated in the central position of lever 75, whereby armature 81 is disconnected from contacts 83 and 184 of the toggle switch, which are engaged by the armature when lever 75 is respectively shifted to the left and right, as illustrated in FIGS. 4 and 5. With lever 75 shifted to the left position, whereby armature 81 engages contact 83, lead 77 is connected to the central terminal of receptacle 24, thence to pin 62 of jack 23 and to lead 52. A direct, permanent connection subsists between lead 78 and outer terminal 85 of receptacle 24 by way of wire 86. Thereby, a direct connection is established between leads 77 and 78 through armature 81 and contact 83 to resistance heating coil 19 and the voltage of supply 14 is applied directly across the resistance heating coil, with maximum current thereby being supplied to the coil.

Simultaneously with maximum current being supplied by supply 14 to heating coil 19, indicator lamp 87, mechanically positioned beneath lens 76, is supplied with current by a path established from armature 81 through contact 83 and resistor 88. Incandescent lamp 87 is thus series connected with resistor 88 in a branch circuit shunting leads 77 and 78, to provide protection to the lamp while full current is being supplied to heating coil 19.

In response to lever 75 being shifted to the right, as illustrated in FIGS. 4 and 5, armature 81 engages contact 184, to establish a series circuit from lead 77 through resistor 88 to resistive heating coil 19 by way of receptacle 24, jack 23, and cable 22. Thereby, a lower current level is supplied by supply 14 to heating coil 19 because resistor 18 is connected in series with the heating coil. Simultaneously, indicator lamp 87 is connected directly in shunt with leads 77 and 78. Because of the reduced current supplied by supply 14 to resistive heating coil 19 by way of resistor 18, there is a lower voltage drop across incandescent lamp 87 at this time than subsists across the series circuit including lamp 87 and resistor 88 when armature 81 engages contact 83. Thereby, lamp 87 is also protected while armature 81 engages contact 184 even though the lamp is directly across leads 77 and 78. The particular circuit arrangement of FIG. 6 has the advantage of providing a substantially constant impedance to leads 77 and 78 regardless of whether armature 81 engages contact 83 or contact 184. This is advantageous because the battery load remains constant and therefore does not adversely affect the other electric devices connected to supply 14 as a function of the position of armature 81 on contact 83 or 184.

In many instances it is desired for cord 21 to be stowed on visor 18 or helmet 17 when the cord is not in use. To this end, cord holding fabric strip 91, FIGS. 2 and 7, is fixedly attached to the exterior of visor 18 just above connector 21 by adhesive strip 92, bonded on opposite faces to the visor and one face of the fabric strip. Strip 91 is folded on itself to selectively form upper loop 93 into which cable 21 is inserted and to form permanent lower loop 94 that comprises a handle for enabling loop 93 to be opened and closed. Loop 93 is formed by connecting end 95 of strip 91 where strip 91 is bonded to visor 18 to midportion 96 of the fabric strip. The connection is preferably provided by sewing hook and loop strips 97 and 98, preferably Velcro, to the faces on end 95 of strip 91 opposite from the face carrying adhesive strip 92 and the inside face of midportion 96, respectively. The same stitching which holds loop strip 98 on fabric strip 91 holds the end of strip 91 opposite from end 95 in place to form loop 94. I have found this configuration to be quite convenient for holding and stowing cable 22 in place when the cable is not used and to minimize forces which might otherwise be exerted on the connections between the cable and connector 21. Further, if an operator decides he does not need the defrosting capability of the invention, cable 22 is stowed so jack 23 is in loop 93 and the cable does not interfere with his vision. When the operator decides to use the defrosting capability, he can pull on loop 94 with his glove on his hand and easily insert jack 23 into plug 24.

While there has been described one specific embodiment of the invention, it will be clear that variations in the details of the embodiment specifically illustrated and described may be made without departing from the true spirit and scope of the invention as defined in the appended claims.

I claim:

1. In combination, an optically transparent face shield adapted to be mounted on a helmet of the type worn by an outdoor open air vehicle operator, a resistance heating coil fixedly secured on a first surface of the visor, the first visor surface being the visor surface in closest proximity to the face of the operator, said coil having a tortous path that does not interfere with the field of view of the driver and including horizontally and vertically extending segments, adjacent ones of the horizontally extending segments having ends in proximity to edges of the visor and being electrically connected to each other by the vertically extending segments, an electric connector housing fixedly attached to a lower corner of the visor on a second surface of the visor opposite from the first surface, the bottom horizontally extending segment having an end terminating at and electrically connected to a first terminal of the connector housing, said end of the bottom horizontally extending segment not being connected to a vertically extending segment, the vertically extending segment connected to an end of the top horizontally extending segment on the same side of the visor as said end of the bottom horizontally extending segment having a bottom end electrically connected to a second terminal of the connector housing, the bottom end of the vertically extending segment not being connected to a horizontally extending segment, the connector housing being located to the side of and approximately at the same horizontal level as the mouth of the pertor when the shield is being worn, a cable having first and second lead wires, connector means for respectively electrically connecting one side of the first and second lead wires to the first and second terminals, a second side of the first and second lead wires respectively terminating on a center metal pin and exterior metal taps of a male electric connector jack adapted to be connected to a female electric connector jack fixedly mounted on an open air vehicle having a power supply connected to the female jack, the connections of the cable to the jack and to the connector means and the cable length and configuration being such that (a) the operator wearing the visor while the cable is connected to the connector means and the jacks so the element is energized by the power supply is able to move normally in a cockpit of the vehicle without affecting the electric connection between the jacks, the cable and the connector means, (b) the male jack pulls out of the female jack without affecting the connection of the cable to the element via the terminal means in response to a sudden force exerted on the cable, as in the case of the operator encountering an emergency, and (c) the cable is not pulled from the connector means when it contacts unavoidable obstructions.

2. The combination of claim 1 wherein the connector housing includes a face abutting against the exterior face of the visor, first and second metal cylinders having parallel longitudinal axes at right angles to the face of the connector housing abutting against the shield exterior face, one end of each cylinder terminating in the housing, the other end of each cylinder terminating at the face of the housing abutting against the exterior of the shield, the cylinders including threaded bores, first and second bolts threaded into the ends of the bores of the cylinders within the housing, the first and second bolts having heads for mechanically and electrically connecting the one side of the lead wires to the ends of the cylinders within the housing, a third metal bolt having a stud piercing the end of the bottom horizontally extending segment connected to the first terminal, a fourth metal bolt having a stud piercing the end of the vertically extending segment connected to the second terminal, the third and fourth metal bolts and the segments connected thereto forming the connections to the first and second terminals of the connector housing by being threaded into the bores of the first and second cylinders, the third and fourth bolts having heads bearing against the interior of the shield for holding the connector housing in place on the shield and against the pierced ends of the horizontally and vertically extending segments for electrically connecting the pierced ends to the leads by way of the bolts and cylinders.

3. The combination of claim 2 further including a switch housing adapted to be mounted on a dashboard of an open air outdoor vehicle, such as a snowmobile, motorcycle or all terrain vehicle, said switch housing including: a female coaxial receptacle for receiving the male coaxial jack, a multiposition switch, a visual indicator lamp, and connection means for connecting a power supply of the vehicle to the coaxial receptacle via the switch and visual indicator lamp so that in response to the switch being in first and second positions current is and is not respectively applied to the lamp and receptacle.

4. The combination of claim 2 further including a switch housing adapted to be mounted on a dashboard of an open air outdoor vehicle, such as a snowmobile, motorcycle or all terrain vehicle, said switch housing including: a female coaxial receptacle for receiving the male coaxial jack, a multiposition switch, a visual indicator lamp, a resistor, and connection means for connecting a power supply of the vehicle to the coaxial receptacle via the switch, resistor, and visual indicator lamp so that in response to the switch being in first, second and third positions: (a) current of a first level is supplied directly from the power supply to the coaxial receptacle and to the lamp, (b) current of a second level is supplied from the power supply to the coaxial receptacle via the resistor and to the lamp, the first level exceeding the second level, and (c) no current is supplied by the supply to either the lamp or the receptacle.

5. The combination of claim 4 wherein the switch and the connection means (a) establish a first branch circuit including the resistor in series with the lamp, in shunt with terminals of the receptacle while the switch is in the first position and (b) connect the resistor in series with a terminal of the receptacle, and a terminal of the power supply and connects the lamp in shunt with the terminal of the power supply while the switch is in the second position, whereby the power supply voltage is across the receptacle terminals and across the first branch circuit while the switch is in the first position and the power supply voltage is across the lamp and across a second branch circuit including the resistor and the receptacle terminals while the switch is in the second position.

6. The combination of claim 1 further including means fixedly mounted on the visor for holding said second side of the cable thereon.

7. The combination of claim 6 wherein said holding means includes a strip of material with means for selectively forming a loop into which said one end is held.

8. The apparatus of claim 1 wherein the first and second lead wires terminate in the connector housing to provide the respective electrical connections thereof to the first and second terminals.

9. The apparatus of claim 1 wherein the cable is helically coiled.

10. A method of preventing and/or removing condensed human breath vapor and/or ice on an optically transparent visor worn by an operator of an open air outdoor vehicle having an electric power supply, such as a snowmobile, motorcycle or all terrain vehicle, comprising the steps of applying an electric resistance heating coil to the visor such that the coil does not affect the field of view of the operator wearing the visor, mounting a female connector on the vehicle, connecting said female connector to the power supply, providing a helical coiled cable with a male connector jack at one end, mechanically and electrically connecting the other end of said connector to the element on the visor, and inserting the male connector jack into the female connector to establish a connection from the power supply to the heat producing element such that the power supply feeds energy to the coil to heat the visor sufficiently to prevent and/or remove the condensation, the connections to the the jack and the visor and the cable being arranged so that (a) the cable coils and uncoils as the operator moves in a normal manner, and (b) the jack pulls out of the female connector without affecting the connection to the visor in response to a sudden force exerted on the cable, as in the case of the operator encountering an emergency, and (c) the cable is not pulled from the visor when it contacts unavoidable obstructions.

11. The method of claim 10 further comprising the step of adjusting the amount of current supplied by the power supply to the heating element as a function of temperature in an environment where the vehicle is being operated by the operator, the amount of current being increased as the temperature decreases.

12. In combination, an optically transparent visor adapted to be worn as a face and eye protector for an operator, means for preventing and/or removing condensed breath vapor and/or ice of the operator on the visor, said vapor and/or ice preventing and/or removing means comprising: an electric heat producing element positioned on the visor such that the element does not affect the field of view of the operator wearing the visor, a cable having a male electric connector jack at one end, a housing mounted on the visor, the housing including electric connector means for electrically connecting leads at the other end of the cable to the heat producing element, the male jack being adapted to be connected to a female electric connector jack fixedly mounted on an open air vehicle and energized by a vehicle power supply for supplying sufficient energy to the element via the cable, jacks and connector means to prevent and/or remove the vapor, the connections of the cable to the jacks and to the connector means and the cable length and configuration being such that (a) the operator wearing the visor while the cable is connected to the connector means and the jacks so the element is energized by the power supply is able to move normally in a cockpit of the vehicle without affecting the electric connection between the jacks, the cable and the connector means, (b) the male jack pulls out of the female jack without affecting the connection of the cable to the element via the terminal means in response to a sudden force exerted on the cable, as in the case of the operator encountering an emergency, and (c) the cable is not pulled from the connector means when it contacts unavoidable obstructions.

13. The apparatus of claim 12 wherein the electric heat producing element is a resistance heating coil, said coil having a tortous path on the visor with horizontally and vertically extending segments, the horizontally and vertically extending segments being positioned and spaced so they are outside of the field of view of the operator, adjacent ones of the horizontally extending segments being connected to each other by the vertically extending segments so that opposite ends of each intermediate horizontally extending segment are connected to first and second vertically extending segments that extend from the horizontally extending segment in opposite directions, one end of each of the top horizontally extending segments being electrically connected by one of said vertical segments of the resistance heating coil to one terminal of the electric connector means on the visor, one end of the bottom horizontally extending segment terminating and being electrically connected to another terminal of the electric connector means on the visor, said electric connector means being mounted in a lower corner of the visor adjacent the bottom end of said one vertical segment and said one end of the bottom horizontally extending segment.

14. The apparatus of claim 13 wherein the resistance heating coil is fixedly secured to a surface of the visor in closest proximity to the face of the operator.

15. The apparatus of claim 12 wherein the cable is helically coiled.

16. The apparatus of claim 12 further including a housing adapted to be mounted on a dashboard of an outdoor open air vehicle to be ridden by the operator, the dashboard housing including the female jack for receiving the male jack.

17. The apparatus of claim 16 wherein the housing includes manually operated switch means for selectively electrically connecting the female receptacle to the power supply.

18. The apparatus of claim 16 wherein the housing includes a resistor, and manually operated switch means for selectively: (a) connecting the female jack directly to the power supply so the full voltage of the supply is applied to the receptacle, (b) connecting the female jack to the power supply via the resistor so a voltage less than the full voltage of the supply is applied to the receptacle, and (c) disconnecting the female jack from the supply.

19. The apparatus of claim 18 wherein the housing includes an indicator lamp connected in circuit with the switch means and female jack so the lamp is energized while current flows from the supply to the resistance heating coil via the switch means, jacks, cable and connector means.

20. The apparatus of claim 12 further including means fixedly mounted on the visor for holding said one end of the cable thereon.

21. The apparatus of claim 20 wherein said holding means includes a strip of material with means for selectively forming a loop into which said one end is held.

22. The apparatus of claim 12 wherein the electric heat producing element is a resistance heating coil fixedly secured to a surface of the visor in closest proximity to the face of the operator.

* * * * *